C. A. JOY.
AUTOMATIC VALVE GEAR.
APPLICATION FILED DEC. 12, 1914.

1,155,245.

Patented Sept. 28, 1915.
2 SHEETS—SHEET 1.

Witnesses
Frederick L. Fox.
R. M. Smith.

Inventor
Charles A. Joy.
By Victor J. Evans
Attorney

C. A. JOY.
AUTOMATIC VALVE GEAR.
APPLICATION FILED DEC. 12, 1914.
1,155,245.
Patented Sept. 28, 1915.
2 SHEETS—SHEET 2.
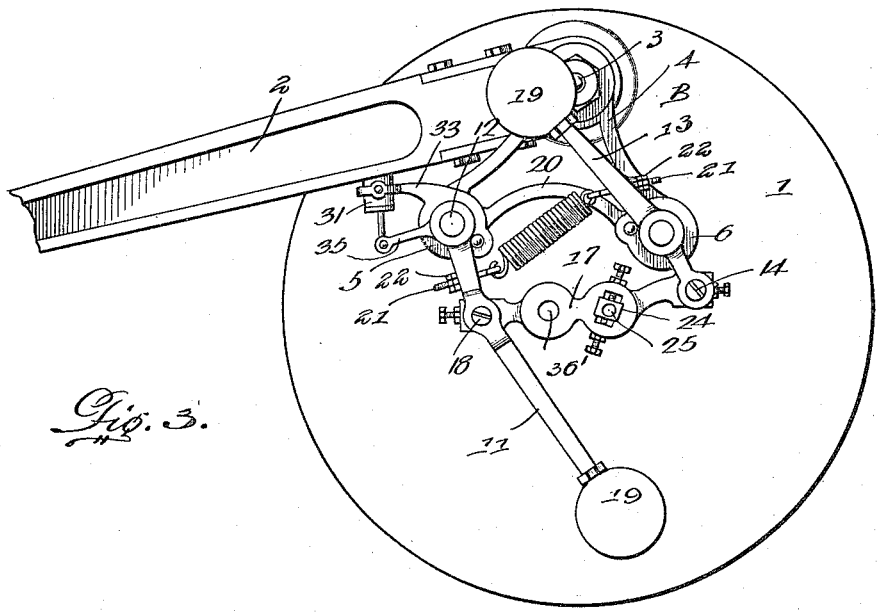
Fig. 3.
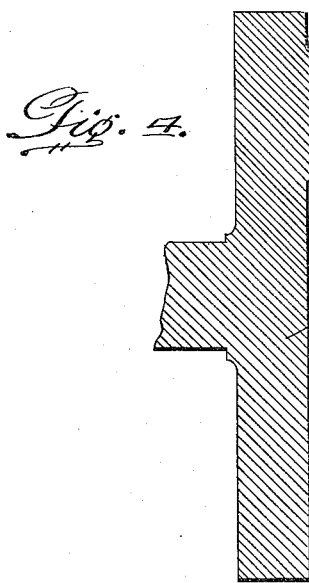
Fig. 4.
Fig. 5.
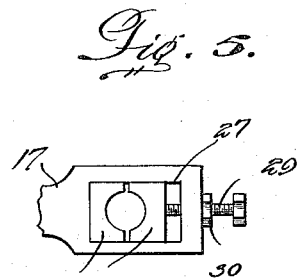
Fig. 6.
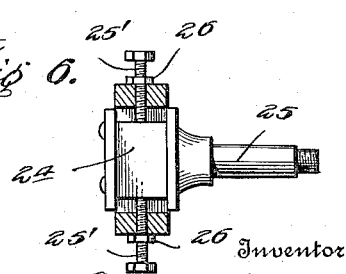
Witnesses
Frederick L. Fox.
R. M. Smith.
Inventor
Charles A. Joy.
By Victor J. Evans.
Attorney

UNITED STATES PATENT OFFICE.

CHARLES A. JOY, OF PARK, WASHINGTON.

AUTOMATIC VALVE-GEAR.

1,155,245.  Specification of Letters Patent.  Patented Sept. 28, 1915.

Application filed December 12, 1914. Serial No. 876,874.

*To all whom it may concern:*

Be it known that I, CHARLES A. JOY, a citizen of the United States, residing at Park, in the county of Whatcom and State of Washington, have invented new and useful Improvements in Automatic Valve-Gears, of which the following is a specification.

This invention relates to engine governors or automatic valve gear for regulating the speed of an engine and enabling the same to be run at uniform speed irrespective of the load thereon.

The object of the present invention is to provide a simple, practical and reliable governor of the class referred to which will do away with the usual eccentric, cam, straps and many other parts now used in devices of the kind, at the same time reducing the amount of friction due to the lessening of the wearing parts; also doing away with the governor wheel and at the same time economizing floor space and providing for a change in the lead of the valve.

A further object of the invention is to so construct the governor that the working parts thereof are exposed and accessible for adjustment without any extra work on the part of the engineer, thus insuring better attention to the governor on the part of the engineer.

With the above and other objects in view, the invention consists in the novel construction, combination and arrangement of parts, as herein described, illustrated and claimed.

Figure 1:
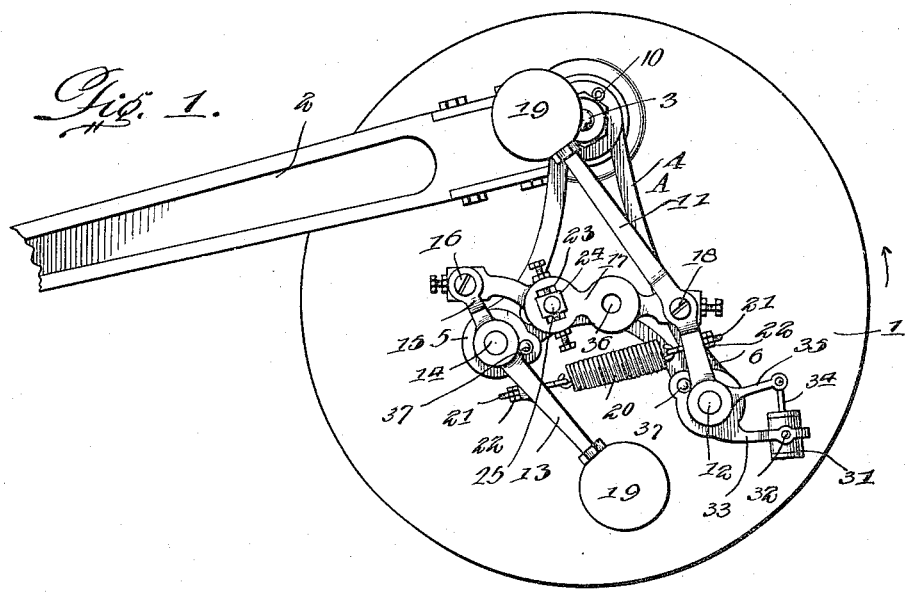
Figure 2:
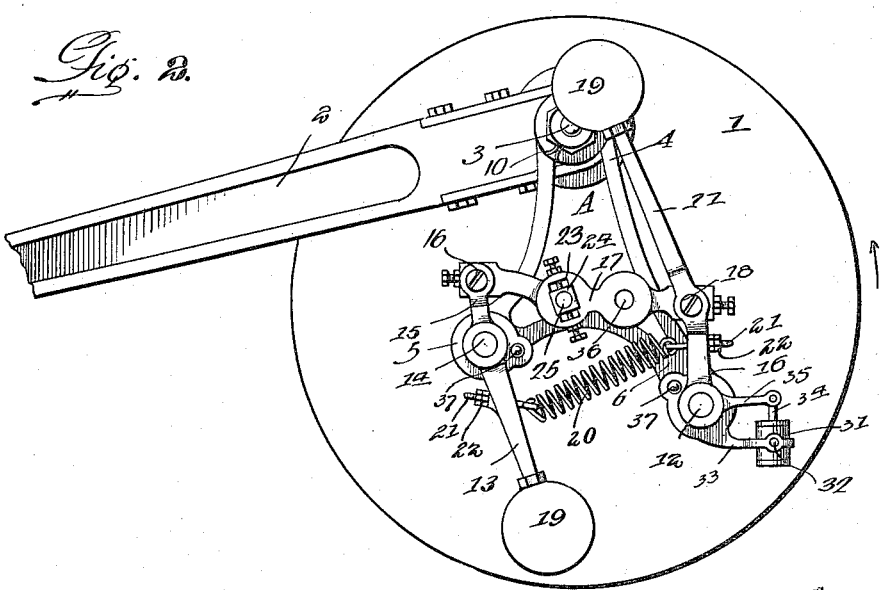

In the accompanying drawings:—Figure 1 is an elevation of the governor of this invention showing the parts in a position of rest. Fig. 2 is a similar view showing the position assumed by the parts while in motion or operation. Fig. 3 is a similar view showing the same principle applied to a governor for the ball or piston type valve. Fig. 4 is a diametrical section taken in line with the wrist pin of the crank wheel. Fig. 5 is a fragmentary elevation showing the adjustable bearing for one of the governor levers. Fig. 6 is a detail cross section through the yoke or link showing the means for changing the lead of the valve.

Referring to the drawings 1 designates the crank wheel or disk of an engine and 2 the connecting rod which has one end thereof journaled on the crank or wrist pin 3. In carrying out the present invention I mount the entire governor mechanism on the crank pin 3. The governor mechanism embodies a supporting frame or hanger designated generally at A, said hanger comprising three arms 4, 5 and 6. The arm 4 is the one which connects directly to the wrist pin 3 and as the hanger 4 must bear a fixed relation to the wheel 1, the arm 4 is provided with a squared and tapered opening 7 which fits tightly upon a correspondingly squared and tapered portion 8 of the pin 3 as illustrated in Fig. 4, the hanger being retained and firmly clamped in position by means of a nut 9 through which is inserted a pin or key 10 for safety. The arms 5 and 6 terminate on opposite sides of the center or axis of the wheel 1 and the arm 6 is of considerably greater length than the arm 5 for a purpose which will presently appear. Fulcrumed on the longer arm 6 is a governor lever 11, said lever being mounted at one extremity on a fulcrum pin 12. An oppositely located governor lever 13 is fulcrumed at 14 between its ends on the shorter arm 5 of the hanger, the last named lever comprising a long arm to which the reference numeral 13 is applied and a short arm 15 to the extremity of which is pivotally connected at 16 a link or yoke 17 pivotally connected at its opposite extremity at 18 to the governor lever 11 at a point between its fulcrum 12 and its free end. Each lever is provided at its free end with a weight 19.

20 designates a speed controlling spring shown as of the coiled contractile type, the opposite extremities of said spring being attached to eye bolts 21 inserted through the governor levers and adjustable by means of nuts and jam nuts 22 by means of which the tension of the spring 20 may be increased or diminished to correspondingly regulate the speed of the engine. The spring 20, it will be noted, is connected at one end to the one armed lever and at its opposite end to the longer arm of the two-armed governor lever.

In order to provide for adjusting the lead of the valve, the link 17 is provided with an obliquely extending slot 23 in which is an adjustable block 24 which carries an eccentric pin 25 to which the valve rod or stem is connected. Bearing against opposite ends of the block 24 are adjusting screws 25′ which are threaded through the opposite walls of the link 17 and held when adjusted by means of lock nuts 26. The pins 16 and 18 are received in adjustable bearings one of which is illustrated in Fig. 5, each bearing being mounted in a slot 27 in one end of the link 17 and comprising relatively movable sections 28 one of which is adjustable toward the other to take up wear by means of a screw 29 held when adjusted by means of a lock nut 30.

31 designates a dash pot the cylinder of which is pivotally mounted at 32 in an extension 33 of one of the hanger arms, the rod 34 of the piston in the dash pot being connected to a laterally extending arm 35 on one of the governor levers as, for example, the lever 11.

The governor hereinabove described is designed for use in connection with the ordinary slide valve of a steam engine. Where the governor is to be used in connection with the well known ball or piston type valve, the hanger designated generally at B in Fig. 3 is made of a different size and proportion, the inwardly extending arms thereof being comparatively short so as to provide for the proper actuation of the valve and give thereto the necessary lead in accordance with the requirement of the engine in connection with which the governor is used. The governor illustrated in Fig. 3 is also equipped with the same means for changing the lead of the valve and in both types of governors, the link is also, by preference, provided with a hole 36 to receive the eccentric pin where a fixed valve lead is sufficient.

The governor hereinabove described enables floor space to be conserved for the reason that the fly wheel may be run close up to the cylinder of the engine as there is no valve gear or steam chest on that side to interfere. The lead of the valve may be found at any moment when the engine is at rest without examining the valve itself. Furthermore, the governor may be connected direct to the valve without the use of any intermediate rockers or levers of any sort. Centrifugal force acting on the governor levers causes the weighted ends thereof to move outwardly and in so doing they force the eccentric pin nearer to the center of the crank shaft thus shortening the valve travel and causing the engine to slow down; as soon as the engine begins to slow down, however, the centrifugal force is reduced and the spring then acts to draw the governor levers inwardly, one force acting against the other, the result being that the engine is maintained at uniform speed.

It is necessary that the weights 19 be in exact line with each other across the center of the crank wheel at all times and in all positions. In order to do this, one of the lever supporting hanger arms is made shorter than the other. The shorter the radius, the less the centrifugal action thereon and therefore it is necessary to shorten the leverage or radius in order to give the weight 19 more travel for the purpose of keeping the weights exactly opposite each other or across and in line with the center of the crank shaft.

In using the governor upon a valve of the ball or piston type it is necessary to reverse the valve travel while the engine is still running in the same direction as the common valve. The dash pot piston may be fastened to the end of one of the governor levers and the cylinder is pivotally mounted adjacent to its center so that it may oscillate sufficiently to permit the levers to travel inwardly and outwardly.

In order to hold the valve wide open when the engine is at rest, one or more stop pins 37 are provided against which the levers rest when moved fully inward, thus enabling the engine to be easily started.

What I claim is:—

1. In governor mechanism for engines, the combination with the crank wheel and the wrist pin thereof, of a hanger supported wholly on said wrist pin, bearing a fixed relation to said crank wheel and having arms extending to opposite sides of the axis of said wheel, weighted governor levers fulcrumed on said hanger arms one of said levers embodying a long arm and a short arm, a valve throwing link connecting one of said levers with the short arm of the other lever, and a speed controlling spring connecting both levers.

2. In governor mechanism for engines, the combination with the crank wheel and the wrist pin thereof, of a hanger supported wholly on said wrist pin, bearing a fixed relation to said crank wheel and having arms of unequal length extending to opposite sides of the axis of said wheel, weighted governor levers fulcrumed on said hanger arms one of said levers embodying a long arm and a short arm, a valve throwing link connecting one of said levers with the short arm of the other lever, and a speed controlling spring connecting both levers.

3. In governor mechanism for engines, the combination with the crank wheel and the wrist pin thereof, of a hanger supported wholly on said wrist pin, bearing a fixed relation to said crank wheel and having arms extending to opposite sides of the axis of said wheel, weighted governor levers fulcrumed on said hanger arms one of said levers embodying a long arm and a short arm, a valve throwing link connecting one of said levers with the short arm of the other lever, means on said link for adjusting the lead of the valves, and a speed controlling spring connecting both levers.

4. In governor mechanism for engines, the combination with the crank wheel and the wrist pin thereof, of a hanger supported wholly on said wrist pin, bearing a fixed relation to said crank wheel and having arms extending to opposite sides of the axis of said wheel, weighted governor levers fulcrumed on said hanger arms one of said levers embodying a long arm and a short arm, a valve throwing link connecting one of said levers with the short arm of the other lever, a speed controlling spring connecting both levers, and means for adjusting the tension of said spring to regulate the speed of the engine.

5. In governor mechanism for engines, the combination with the crank wheel and the wrist pin thereof, of a hanger supported wholly on said wrist pin, bearing a fixed relation to said crank wheel and having arms extending to opposite sides of the axis of said wheel, weighted governor levers fulcrumed on said hanger arms one of said levers embodying a long arm and a short arm, a valve throwing link connecting one of said levers with the short arm of the other lever, a speed controlling spring connecting both levers, and a stop device to hold said governor levers in position to hold the valve open when the engine is at rest.

In testimony whereof I affix my signature in presence of two witnesses.

CHARLES A. JOY.

Witnesses:
W. H. CAMPBELL,
GEO. B. DENT.

Copies of this patent may be obtained for five cents each, by addressing the "Commissioner of Patents, Washington, D. C."